Nov. 2, 1965  H. J. LANGE ETAL  3,215,810
CONTINUOUSLY ROTATING DIAL FEED WELDER
Filed May 28, 1962  5 Sheets-Sheet 1
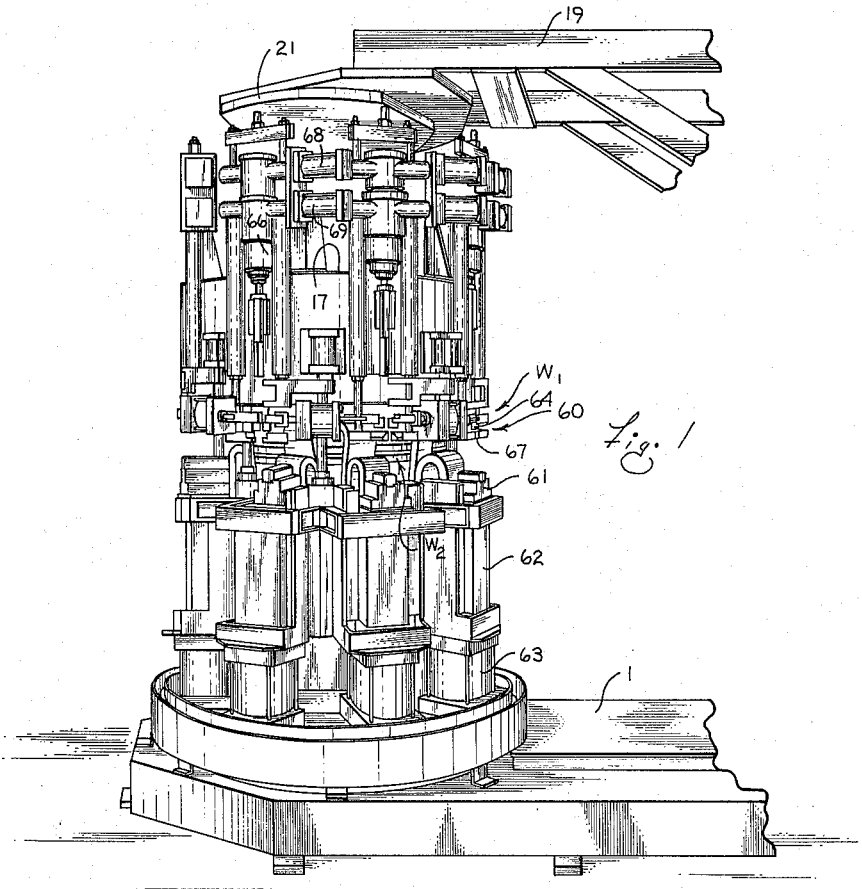
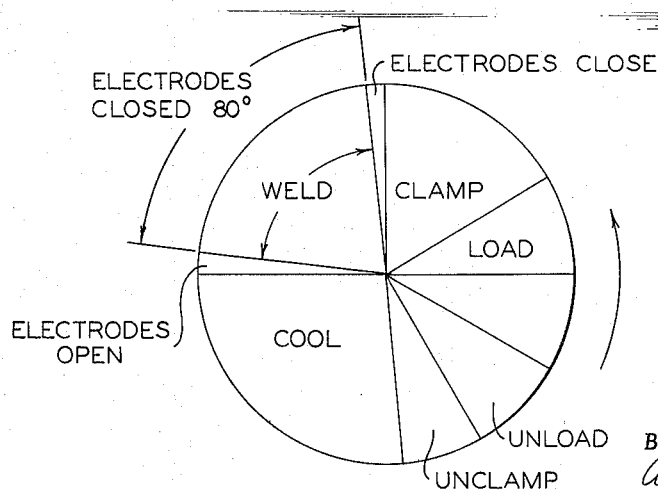
INVENTORS
HAROLD J. LANGE
JOHN MORLEY
BY
Woodhams, Blanchard & Flynn
ATTORNEYS Nov. 2, 1965
H. J. LANGE ETAL
3,215,810
CONTINUOUSLY ROTATING DIAL FEED WELDER
Filed May 28, 1962
5 Sheets-Sheet 2
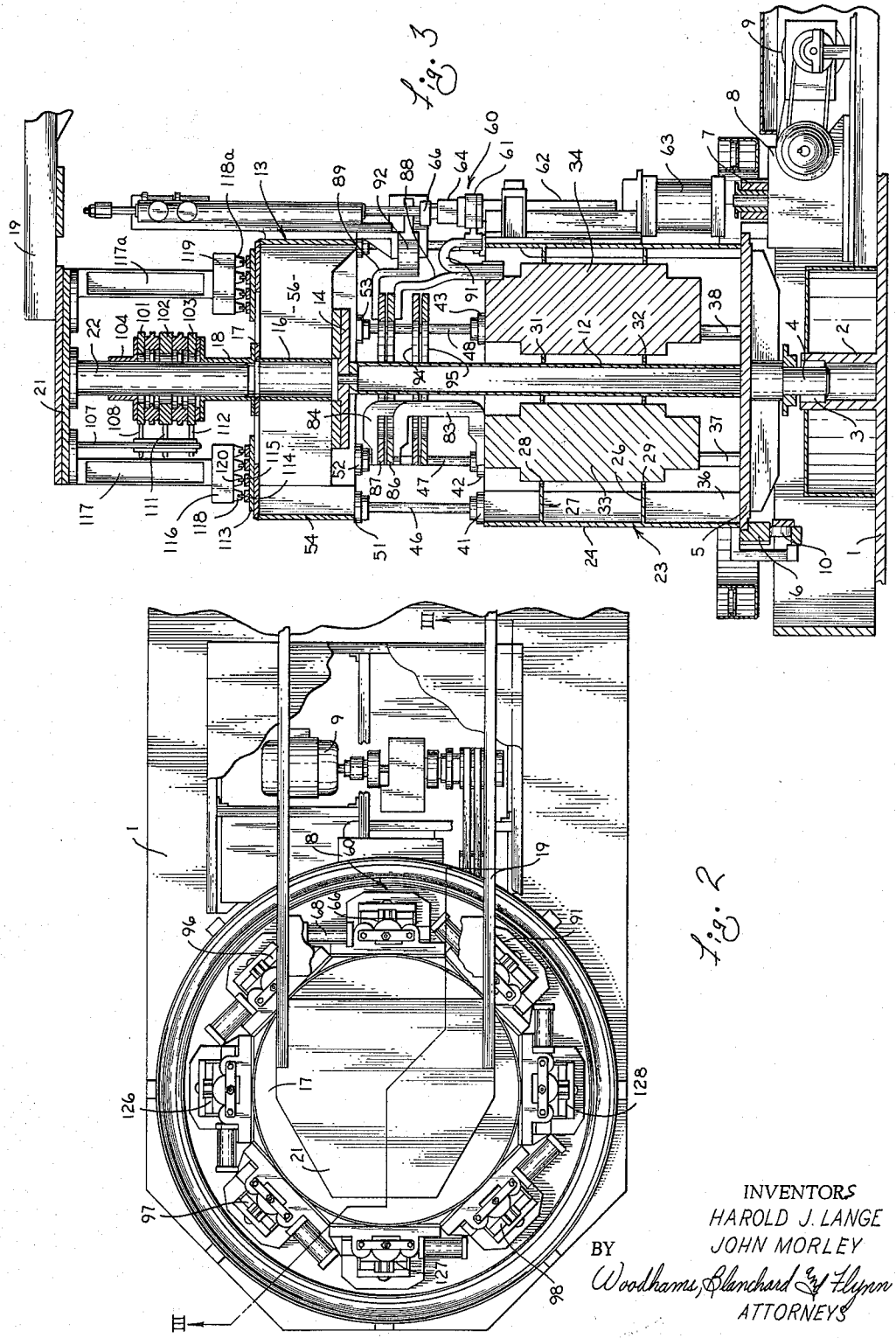
INVENTORS
HAROLD J. LANGE
JOHN MORLEY
BY
Woodhams, Blanchard & Flynn
ATTORNEYS Nov. 2, 1965 H. J. LANGE ETAL 3,215,810
CONTINUOUSLY ROTATING DIAL FEED WELDER
Filed May 28, 1962 5 Sheets-Sheet 3
UPPER "A" RING
TOP VIEW
UPPER "B" RING
TOP VIEW
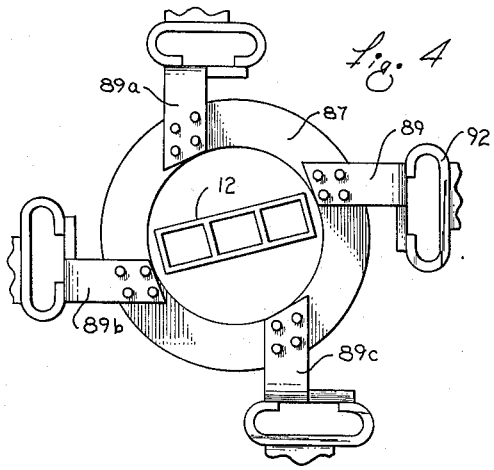
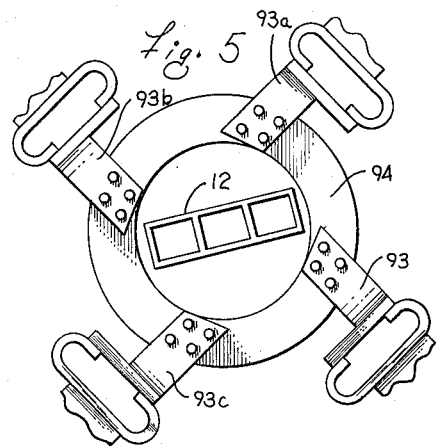
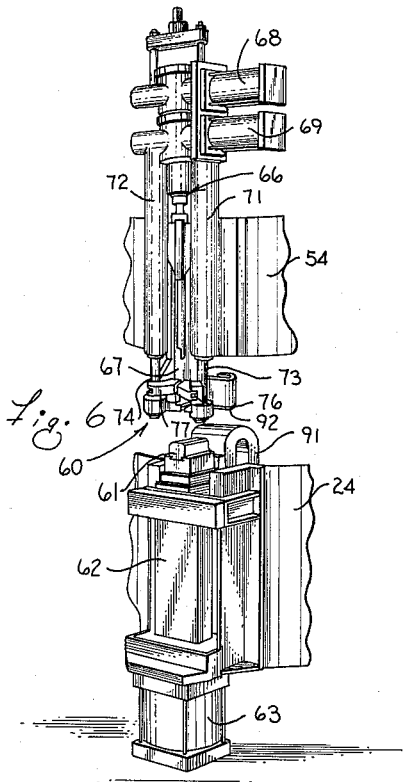
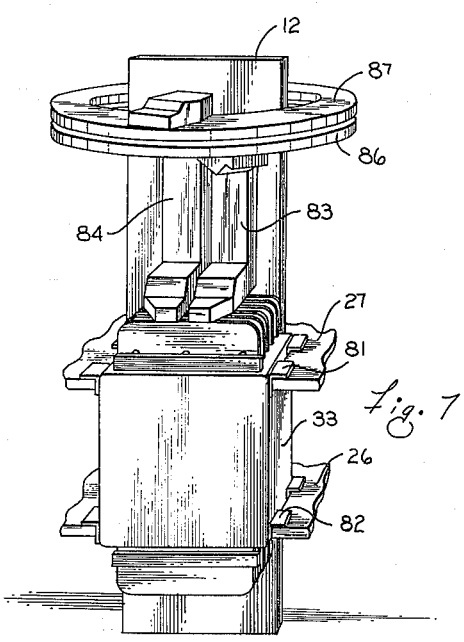
INVENTORS
HAROLD J. LANGE
JOHN MORLEY
BY
Woodhams, Blanchard and Flynn
ATTORNEYS Nov. 2, 1965   H. J. LANGE ETAL   3,215,810
CONTINUOUSLY ROTATING DIAL FEED WELDER
Filed May 28, 1962   5 Sheets-Sheet 4
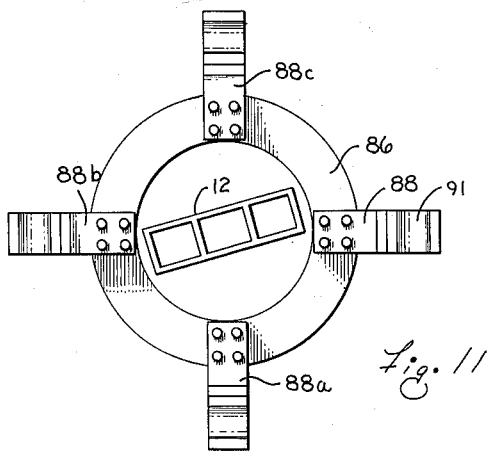
LOWER "A" RING
BOTTOM VIEW
Fig. 11
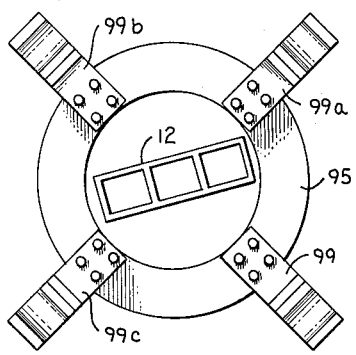
LOWER "B" RING
BOTTOM VIEW
Fig. 12
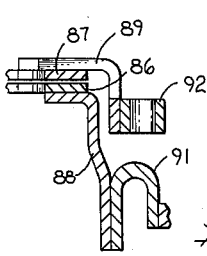
Fig. 9
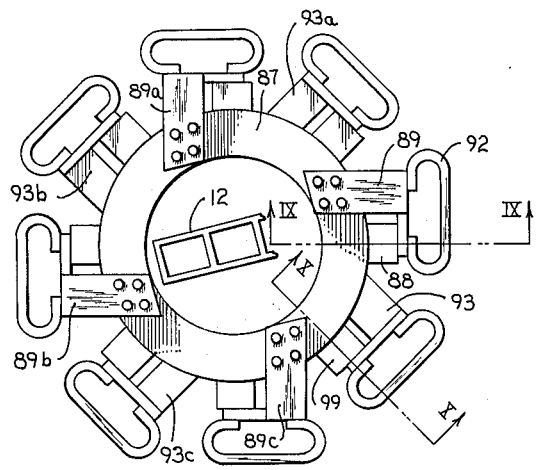
ALL RINGS, TOP VIEW   Fig. 8
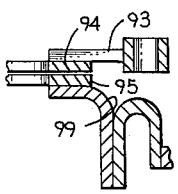
Fig. 10
INVENTORS
HAROLD J. LANGE
JOHN MORLEY
BY
Woodhams, Blanchard and Flynn
ATTORNEYS

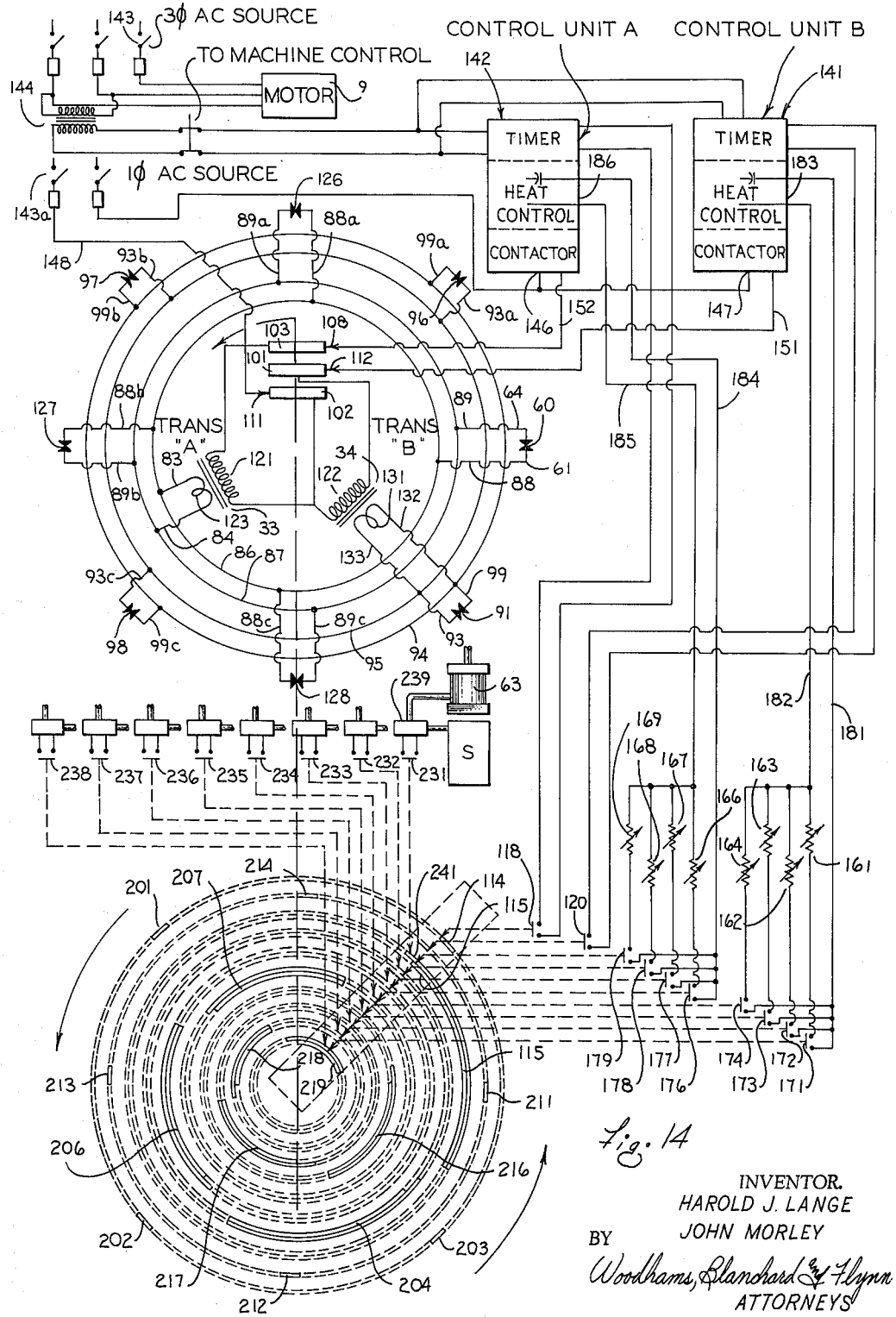

United States Patent Office 3,215,810
Patented Nov. 2, 1965

3,215,810
CONTINUOUSLY ROTATING DIAL
FEED WELDER
Harold J. Lange and John Morley, Bay City, Mich., assignors to National Electric Welding Machines Co., Bay City, Mich., a corporation of Michigan
Filed May 28, 1962, Ser. No. 198,086
11 Claims. (Cl. 219—79)

This invention relates to welding machinery and particularly to a machine having a continuously rotating table carrying both the work and the welding electrodes.

In previously known welding machines of the type having rotatable (either continuously or intermittently) tables for carrying both the work and the welding electrodes, there have been certain difficulties with respect to various features of the machines which have seriously limited their usefulness. Among these difficulties has been the fact that in previous machines of the general type, the transformer has been mounted on the nonmoving, or frame, part of the machine and the welding electrodes have been mounted on the rotatable part of the machine. Thus, slip rings were required to carry current from the transformer to the electrodes and these were in circuit with the secondary winding of the transformer. With the large amounts of current carried in machines of appreciable size, this has raised obvious and recognized problems of arcing and pitting at the slip rings. Another problem connected with previously known machines has resided in the fact that it was necessary either to supply and control each pair of electrodes from and by a separate transformer and a corresponding slip ring and timer or, alternatively, it was necessary to separate sufficiently the operational cycles of the plurality of electrodes so that there would be welding current flowing in only one pair of electrodes at a time. The first alternative is unacceptably expensive for most applications. The second alternative normally limits the speed of operation because current flow at one station must be completed before starting current flow at another station. This has in many cases limited the productive capacity of the machine to something less than is required by the cost of providing for fully automatic operation.

Accordingly, the objects of the invention include:

(1) To provide a fully automatic welding machine of the type having both the welding heads and the work carried on a rotating table which can carry a greater number of work stations on said table than was previously feasible within reasonable cost limitations.

2) To provide a welding machine, as aforesaid, having no interruptions in the secondary circuit of the welding transformer other than the interruption provided by the welding electrodes themselves.

(3) To provide apparatus, as aforesaid, capable of carrying a plurality of work stations, each thereof having a pair of welding electrodes and a work holder, wherein the flow of welding current in each pair of electrodes overlaps in time the flow of welding current in a physically adjacent pair of electrodes.

(4) To provide a welding machine, as aforesaid, which is particularly adaptable to a continuously rotating table.

(5) To provide a welding machine, as aforesaid, having a plurality of transformers, each thereof connected to more than one pair of welding electrodes.

(6) To provide a welding machine, as aforesaid, carrying the transformers on the rotating table in order that the current transfer devices relating the fixed portion of the circuitry to the movable portion thereof, such as slip rings, will be in circuit with the primary winding of each of the transformers rather than in the secondary winding thereof.

(7) To provide a welding machine, as aforesaid, utilizing only a single timer with each transformer.

(8) To provide a welding machine, as aforesaid, providing individual compensation for the differences in impedance between a given transformer and the several welding electrodes associated with such transformer.

(9) A further object of the invention has been to provide a machine, as aforesaid, having relatively simple control means which can be provided without unreasonable expense and which can be kept in operating condition without excessive maintenance cost.

(10) A further object of the invention has been to provide a machine, as aforesaid, wherein the malfunctioning of one pair of welding electrodes or parts associated therewith will not affect the proper functioning of other pairs of electrodes in order that trouble arising with respect to any given pair of electrodes or parts associated directly therewith can be readily isolated, identified and corrected.

Other objects and purposes of the invention will be apparent to persons acquainted with apparatus of this general type upon reading the following description and inspection of the accompanying drawings.

In the drawings:

FIGURE 1 is an oblique view of the machine embodying the invention.

FIGURE 2 is a top plan view of the machine shown in FIGURE 1.

FIGURE 3 is a section taken on the line III—III of FIGURE 2.

FIGURE 4 is a top view of the center post and the upper one of the upper pair of distribution rings, the same being separated from the rest of the apparatus for clarity.

FIGURE 5 is a top view of the center post and the upper one of the lower pair of distribution rings, the same being separated from the rest of the apparatus for clarity.

FIGURE 6 is a fragmentary oblique view of a single welding location separated from the rest of the machine for clarity.

FIGURE 7 is an oblique view of a transformer, distribution rings, and bars connecting said transformer to said distribution rings separated from the rest of the machine for clarity.

FIGURE 8 is a composite top view of all of the distribution rings and means connecting same to the several welding heads.

FIGURE 9 is a section taken on the line IX—IX of FIGURE 8.

FIGURE 10 is a section taken on the line X—X of FIGURE 8.

FIGURE 11 is a bottom view of the lower one of the upper pair of the distribution rings.

FIGURE 12 is a bottom view of the lower one of the lower pair of distribution rings.

FIGURE 13 shows the operational cycle of one pair of welding electrodes.

FIGURE 14 is a diagrammatic illustration of the apparatus and the control means associated therewith.

*General description*

In general, the invention contemplates providing a rotatable table for carrying on its periphery both work holding means and welding electrodes. At least two welding transformers are mounted on said table for rotation therewith, the secondary winding of one of said transformers being connected to one group of welding electrodes and the secondary winding of the other transformers being connected to another group of welding electrodes. Respective electrodes of one group are positioned alternately with the respective electrodes of the other group. An individual timing unit is provided for each transformer but the heat control portion thereof has a plurality of adjustable and selectable means determining the output of the heat control unit. Suitable triggering means is activated as each welding electrode is activated for selecting one of said heat control means and connecting same into the circuit of the welding transformer being then energized, whereby by appropriate setting of said individual heat control units effective compensation can be made for differences in impedance between a given transformer and the several pairs of welding electrodes associated therewith.

*Detailed description*

Inasmuch as the present invention deals primarily with a system of operating the turret-type welding machine and only secondarily with some of the details of construction thereof, the following description will refer to the constructional features only sufficiently to present a clear understanding of the system and structural features not necessary in the understanding of the system will be omitted from this description with the understanding that same are conventional and may be readily supplied as needed or desired by those skilled in the art.

Turning now to an illustrative embodiment of the invention in more detail, as same is illustrated in the drawings, there is provided a base 1 having an upstanding bearing support 2 (FIGURE 3) for retaining and supporting a bearing 3 in which is received a shaft 4 which is thereby centered. Said shaft 4 is connected to a table 5 which table is surrounded by a drive gear 6 driven by a pinion 7. Said table is supported vertically by a series of rollers 10. Said pinion is driven in any conventional manner from a suitable speed reduction gear box 8 which is in turn driven from a motor 9. Said table 5 supports a center post 12, here rectangular in shape, which in turn supports at its upper end the crown 13. The crown 13 is comprised of a crown base 14 which is affixed to the upper end of the post 12 in any convenient manner, a crown post 16 coaxial with the center post 12 and supported upon the crown base 14, a crown top sheet 17 arranged perpendicularly to the crown center post 16 and an upper guide sleeve 18 which is coaxial with the crown center post 16 and extends upwardly from the crown upper sheet 17. A bracket 19 is mounted in any convenient manner to means which are rigid with respect to the base 1 and supports a plate 21 rigidly with respect thereto. An upper guide post 22 is rigidly affixed to said upper plate 21, extends downwardly therefrom and is rotatably received into the upper guide sleeve 18.

A frame body 23 is supported upon the table 5 and concentric with the geometric center of the center post 12. It comprises a cylindrical body portion 24 having a plurality, here two, of horizontal plates 26 and 27 extending horizontally across the space between the opposite sides of said body portion 24. Said plates 26 and 27 are provided with openings at their respective centers for the passage therethrough of the center post 12 and are further provided with openings 28, 29, 31 and 32 for the reception therethrough of the transformers 33 and 34 hereinafter discussed in more detail. If desired, there may also be provided inwardly extending reinforcing ribs of which three appear at 36, 37 and 38. Suitable pads of which three are indicated at 41, 42 and 43 are provided at the upper end of the body part 24 and aligned with said inwardly extending ribs 36, 37 and 38, respectively, for the support of appropriate frame rods 46, 47 and 48, respectively. The upper ends of said respective frame rods are connected through further pads 51, 52 and 53 respectively, to the lower edge of a cylindrical housing sheet 54 of the crown 13 which sheet hangs downwardly from the upper crown sheet 17. Further reinforcing members of which one appears at 56 may be arranged radially, or spokewise, between the housing 54 and the crown center post 16 for reinforcing and stiffening purposes.

Arranged around the periphery of the housing 23 and mounted thereon is a plurality, here eight, of identical work stations of which two are generally indicated at W1 and W2 (FIGURE 1). These may be of any type convenient in view of the particular work to be handled by the machine and as such form no part of the invention. Said work stations are mounted in a conventional manner as desired. The work station W1 includes a welding electrode structure 60 of which a lower electrode 61 is mounted upon vertically movable means vertically actuatable by an appropriate pressure fluid energized cylinder 63. An upper electrode 64 (FIGURE 3) may, if desired, be arranged for vertical movement by any desired control mechanism 66, which control mechanism is conventional, available in any of many kinds and arrangements and needs no detailing here.

Said work stations each also include suitable workgripping means 67 (FIGURES 1 and 6) which may also be of any of many conventional forms. Said gripping means are in this instance operated by a pair of air cylinders 68 and 69 which act through suitable gearing on shafts extending through housings 71 and 72 and extend downwardly below said housings at 73 and 74. The shaft extensions 73 and 74 are connected to and actuate the work clamps respectively indicated at 76 and 77.

A suitable plurality, here eight, of said upper and lower electrodes and parts associated therewith are arranged around the periphery of the apparatus and are fastened by any suitable means desired, such as by welding same to the cylindrical sheet 24 for the lower electrode means and to the cylindrical sheet 54 for the upper electrode and associated means. In this embodiment the eight pairs of electrodes are arranged alternately in two groups of four each as hereinafter further described and hereinafter designated as Group A and Group B. The arrangement of said electrode groups around the periphery of the welding machine frame is best seen in the top view of FIGURE 2 wherein the positioning of the several electrode units around the machine is clearly illustrated.

Within the machine there are mounted in this embodiment two transformers each of which is arranged to supply four pairs of electrodes. Referring primarily to FIGURES 3 and 7, it will be seen that the transformers 33 and 34 are mounted by any suitable brackets of which two are indicated at 81 and 82 to the horizontal frame plates 26 and 28. A pair of upstanding conductors 83 and 84 are connected to the snouts of the transformer 33 rigidly with respect thereto. Said conductors are connected to the terminals of the secondary winding of the transformer to provide the output conductors therefor. Conductor rings 86 and 87 are fastened rigidly to and supported by the upstanding conductor 83 and 84, respectively. Another pair of conductors appear at 88 and 89 (FIGURE 3) and are provided for connecting said lower and upper rings respectively to the lower and upper electrodes 61 and 64. The conductors 88 and 89 will normally be heavy rigid copper bars which are connected through flexible connectors 91 and 92, respectively, to said electrodes. Said flexible connectors function in the usual manner to permit relative motion of said electrodes with respect to the frame of the machine during the opening and closing movements of the electrodes. The pattern of the several conductors 89, 89a, 89b and 89c as same leave the upper electrode ring 87 for connection to one group (Group A) of four pairs of electrodes appears in FIGURE 4 wherein the conductor 89 appears in the top plan view and other conductors 89a, 89b and 89c, all identical with the conductor 89, are shown as they are arranged with respect to the upper conductor ring 87. The lower electrode conductor 88 and its various counterparts 88a, 88b and 88c (FIGURE 11) for connecting said lower ring 86 to the other of the first group of four electrode pairs is arranged in a generally similar manner to the upper conductors and below same in a pattern generally similar to the upper conductors.

The other transformer appearing at 34 (FIGURE 3) is mounted on the horizontal plates 26 and 27 diametrically opposite the transformer 33 and has a similar upstanding pair of conductors (not shown) corresponding to the conductors 83 and 84 of the transformer 33 for connecting to and supporting the lower pair of conductor rings 94 and 95. Further conductors then connect said rings 94 and 95, respectively, to the other group (Group B) of four pairs of electrodes in a manner identical with that above described in connection with the pair of rings 86 and 87 and hence need no detailing except to detail the pattern thereof as appearing in FIGURES 5 and 12. Here one conductor 93 connects the upper ring 94 to the upper electrode of one of the Group B pairs of electrodes, such as the pair indicated at 91 (FIGURE 2). Similar conductors 93a, 93b and 93c are provided corresponding to conductors 89a, 89b and 89c for connecting respectively to the upper electrodes of the electrode pairs 96, 97 and 98, respectively. The lower ring 95 is connected by a conductor 99 (FIGURE 12) to the lower one of the pair of electrodes indicated at 91 and by the corresponding conductors 99a, 99b and 99c to the lower electrodes respectively of the electrode pairs 96, 97 and 98.

Suitable slip rings 101, 102 and 103 are mounted on and for rotation with the upper guide sleeve 18, are suitably insulated from each other and themselves support a further guide sleeve 104 which encircles and rotatably engages the upper guide post 22. A downwardly extending hanger 107 is rigidly mounted on and hangs downwardly from the plate 21 and supports suitable brushes 108, 111 and 112 which bear respectively against said slip rings.

A cam plate 113 is mounted on and for rotation with the upper sheet 17 and this cam plate supports a plurality of cams of which two are indicated at 114 and 115. A switch bar 116 is mounted on and rigidly with respect to the upper plate 21 by any convenient means, such as by a hanger 117. A plurality of switches of which two are indicated at 118 and 120 are arranged on said switch bar 116 and extend downwardly therefrom for actuation by appropriate ones of said cams. Said cams are preferably removable for adjustment and/or replacement as desired for effecting proper timing control of the apparatus. If needed, a further switch bar 119 may be supported by a further hanger 117a at a point circumferentially spaced from the hanger 117 for supporting further switches of which one is indicated at 118a.

Referring now to FIGURE 14 for the connections and means interrelating the mechanical parts above described, there are shown the transformers 33 and 34 whose primary windings 121 and 122, respectively, have a common connection to the slip ring 102. The opposite ends of said respective primary windings are connected as shown to slip rings 103 and 101, respectively. Primary current is brought to the slip rings through brushes 108, 111 and 112. The terminals of the secondary windings of said transformers 33 and 34 are in this embodiment respectively connected in parallel to the several pairs of welding electrodes in each of Group A and Group B thereof. More specifically, the transformer 33 has its secondary winding 123 connected as above described by conductors 83 and 84, respectively, to the lower conductor ring 86 and to the upper conductor ring 87. Said conductor rings are connected respectively by the conductors 88 and 89 above described to the welding electrodes 61 and 64. Other conductors 88a and 89a connect said upper pair of rings 86 and 87 to the electrodes 126, connectors 88b and 89b connect to electrodes 127 and conductors 88c and 89c connect to electrodes 128.

Similarly, transformer 34 has its secondary winding 131 connected by conductors 132 and 133, respectively, to the respective lower conductor rings 94 and 95. Said lower conductor rings are connected by conductors 93 and 99 to the electrodes 91. Other conductors 93a and 99a connect said lower pair of connector rings to the electrodes 96, conductors 93b and 99b connect said lower conductor rings to the electrodes 97 and conductors 93c and 99c connect said lower conductor rings to the electrodes 98.

Thus, energizing of the transformer 33 will simultaneously place a voltage across the pairs of electrodes indicated at 60, 126, 127 and 128 while energizing of the transformer 34 will simultaneously place a voltage across the electrodes indicated at 91, 96, 97 and 98.

Turning now to the controls for energizing the primary windings of said transformers, there is provided a pair of control units 141 and 142. These are conventional, may be either electronic or electromechanical, but will be here assumed for reference purposes as electronic. The source of control electrical potential is one phase of a three phase A.C. power source 143 and this control potential source is connected in a conventional manner to the primary winding of a transformer 144, the secondary winding of which is connected to the control units 141 and 142. One terminal of a separate, single phase A.C. power source 143a, is connected at one end to the input terminals 146 and 147 of said electronic contactors and the other end of said power source 143a is connected by a conductor 148 to the common slip ring 102 through brush 111. The output of contactor B is connected by a conductor 151 to one group-connected slip ring, here the slip ring 101, through brush 112 and the output of the other contactor A is connected by the conductor 152 to the other group-connected slip ring, here the slip ring 103 through brush 108. Thus, closing of the contactor portion of the control units will apply potential across the selected pair of said slip rings and thereby energize the primary windings of said transformers.

It will be recognized, however, that the connections of the transformer 33 to the several pairs of electrodes to which it is connected are unequal in length and, therefore, the impedance values between the output terminals of said transformer 33 and the several pairs of electrodes to which it is connected are unequal. The same will be true of the transformer 34 and the several pairs of electrodes to which it is connected. Therefore, since these inequalities in impedances between said respective transformers and the electrodes to which they are respectively connected will affect the power delivered to the several pairs of electrodes, means must be found to compensate for these inequalities or the welds produced at and by the respective pairs of electrodes will be unequal. This will be particularly disadvantageous where the parts to be handled are small, or comprise difficult-to-weld materials, so that the weld heat must be closely controlled to produce a satisfactory weld without damaging the parts.

This is accomplished through the heat control means normally provided in the control units 141 and 142, said heat control means normally incorporating phase-shift circuitry as their controllable part. Such phase-shift circuitry may involve various variable means but for illustrative purposes herein it will be assumed that the variable element of the phase-shift circuitry is a variable resistance. Thus, varying said resistance will vary the degree of said phase-shift between the energizing of the welding electrodes and the supply of power from the source and accordingly in a well-known manner fully familiar to those skilled in the art effect a control over the heat supplied by the welding electrodes to a given workpiece.

Therefore, in the present apparatus there is provided a plurality of variable resistances 161, 162, 163 and 164 arranged with the heat control portion 183 of the control unit 141 and a further plurality of variable resistances 166, 167, 168 and 169 arranged with the heat control portion 186 of the control unit 142. The resistances 161–164 are connected, respectively, to switches 171, 172, 173 and 174 whereas the resistances 166–169 are connected, respectively, to switches 176, 177, 178 and 179. Each of said switches 171–174 is connected by a conductor 181 to one side of said phase-shift heat control portion 183. The conductor 182 connects the other side of said heat control portion 183 to the several resistances 161–164.

The resistances 166–169 are similarly connected by conductors 184 and 185 through the switches 176–179 to phase-shift heat control portion 186 of the control unit 142.

The said switches 171–174 and 176–179 are also arranged on one of the switch bars 116 and 119 in the same manner as are the above-mentioned switches 118 and 120. Suitable further cams, similar to cams 114 and 115 already mentioned, are arranged on the cam plate 113 to actuate the actuators of said switches in a desired pattern.

A further series of switches 231–238 are provided for effecting the opening and closing of the welding electrodes. For example, the switch 231 is connected to a suitable solenoid 239 interposed in a line between a pressure source S and one of the cylinders for closing the electrodes, such as the cylinder 63. The others of said switches are similarly connected to corresponding solenoid valves similarly controlling the others of the electrode closing cylinders in a known manner. The actuators of each of said switches 231–238 are arranged for actuation by cams positioned as desired on said machine, such as also on the cam ring 113.

*Operation*

The operation of the apparatus has already been somewhat indicated above in connection with the description of its construction but will be reviewed further to insure a complete understanding of the invention.

Upon energization of the motor 9, the table 5 is caused to rotate, preferably at a constant speed, and the several work holders and accompanying pairs of welding electrodes are presented successively to appropriate loading and unloading stations. The cylinders 68 and 69 are actuated by means not shown, but which can be further switches and cams on the cam plate 113, to rotate the shaft extensions 73 and 74 and thereby actuate the several work holders 76 and 77 after which the cylinder 63 of a given welding unit is actuated, as by closure of the switch 231 by a cam 241, and the electrodes closed. All of this is conventional, forms no part of the present invention and is outlined here only schematically for completeness in understanding of the invention. The workpiece being held in welding unit 60 now enters the welding zone and the appropriate cam, such as the cam 114, actuates the switch 118 to start the control unit 142. This closes the contactor portion thereof and supplies an electrical potential to the slip ring 103 through brush 108 which energizes the primary winding 121 of the transformer 33. This applies potential to the terminals of the Group A welding units consisting of the electrodes 60, 126, 127 and 128. However, only the electrodes 60 are at this moment closed so that welding current will flow through only these electrodes and thereby weld the work positioned therebetween.

At the same time that cam 114 has closed switch 118, the cam 115 has closed the switch 179 and placed into the phase-shift portion of the heat circuit the resistance 169 which has been adjusted to cause the proper heat to be supplied to the electrodes 60. The length of the cam 115 is long enough to insure its lasting to or beyond the end of the welding time. The welding current is, however, controlled by the control unit, or timer 142, and when this times out the welding current terminates. A suitable cooling or "hold" follows after which the switch 231 is released by the cam 241 and the cylinder 63 is de-energized to permit the opening of the electrodes 60. This is followed immediately by the release of the work holder and the part is ready to unload.

In the present embodiment, it will be observed that the weld period extends for about 80° of the complete circle of rotation for any given pair of electrodes. The time during which both electrodes contact the work, which includes the weld period, can be of different lengths depending on the number of stations and the number of transformers but for the eight station, two transformer, embodiment of the invention disclosed in the drawings, the electrode closed time should not exceed 90° of the complete circle of rotation of the electrodes. Since the time required to open and close the electrodes is short, the weld period can, if desired or necessary, be close to 90° for the particular machine disclosed herein. This follows from the necessity that, for example, the electrodes 60 be reopened before the next following pair of electrodes in the Group A, namely, electrodes 128, are closed and the welding current again turned on. The electrodes 128 will be closed and the current again turned on when the electrodes 128 are, for example, 100° from the loading point. At this moment, the electrodes 60 are 90° ahead of that point or at the 190° point from said loading point. Thus, the electrode 60 whose own current was turned on at the 100° point must not only have the current turned off but the electrodes must be opened by the time they reach the 190° point in order to insure that when current is again turned into the Group A electrode system that said current will flow through only the electrodes 128.

However, in the meantime, electrodes 91 have already arrived at the loading point, have been loaded and have been energized. However, since the electrodes 91 are one of the Group B electrodes, energizing of said electrodes will have no effect upon the energizing of the electrodes 60. Thus, by having alternate pairs of electrodes in separate energization systems, parts successively handled at the loading point may be permitted to overlap in their weld periods but without requiring the complexity involved in having separate electrical systems for each pair of electrodes.

It will be recognized that the present embodiment utilizes two separate groups of electrodes for illustrative purposes but that more such independent systems may be used if desired.

It will be observed that the beginning point of one of the heat control cams such as the cam 115 is aligned with one of the control unit starting cams, here the cam 114, to effect an appropriate adjustment of the heat supplied to a given pair of electrodes simultaneously with the energizing of such electrodes. Thus, cam 114 which serves to start the control unit 142 is in position for supplying heat to the Group A system when the electrodes 60 are in position to be energized. Similarly, the cams 203, 202 and 201 are positioned for turning heat on to the Group A system when the electrodes 128, 127 and 126, respectively, are in position for being energized. The cam 204 actuates the switch 178 simultaneously with the operation of switch 118 by cam 203 to bring the resistance 168 into the heat control circuit for supplying the proper heat when the electrodes 128 are energized. Similarly, the cam 206 is matched with the cam 202 and the cam 207 is matched with the cam 201.

Similarly, the cam 211 will actuate the switch 120 for starting the control unit for the Group B electrodes and it is followed by the cams 212, 213 and 214, respectively, which are positioned for starting the electrodes 98, 97 and 96, respectively. The heat controlled cams 216, 217, 218 and 219 are respectively matched with the above-mentioned cams 211, 212, 213 and 214 for operating the switches 174–171, respectively, and effecting appropriate heat control for each of the Group B electrodes as they are successively energized.

While all of the cams have in this embodiment been illustrated as placed on the cam plate 113 for easy comparison purposes, at least some of such cams may alternatively be placed on the table 5, if preferred, and in any case it will be recognized that the exact placement of the cams is merely a matter of choice and that the cams and switches operated thereby may be freely arranged in these or many other ways which are well known to the art and will be readily selectable by those skilled in the art to meet the requirements of a given machine and its intended conditions of use.

Although a particular preferred embodiment of the invention has been described above in detail for illustrative purposes, it will be recognized that variations or modifications of such disclosure, which lie within the scope of the appended claims, are fully contemplated.

What is claimed is:

1. In an electric welding machine, the combination comprising:
a table and means mounting and driving same for effecting rotation thereof;
a plurality of work stations arranged circumferentially around said table;
at least two groups of pairs of welding electrodes, each pair thereof being arranged in operative association with a respective one of said work stations;
at least two welding transformers;
means connecting one group of pairs of electrodes for simultaneous application of voltage thereto by the secondary circuit of one of said transformers and means connecting the other group of pairs of electrodes for simultaneous application of voltage thereto by the secondary circuit of the other of said transformers, the respective pairs of electrodes of said one group being positioned alternately on said table with the respective pairs of electrodes of said other group;
supply means including current transfer devices in the primary windings of said transformers for transferring current between relatively moving parts for energizing the primary windings of said transformers in a predetermined, alternate, pattern co-ordinated with the opening and closing of said pairs of electrodes with respect to each other.

2. The device defined in claim 1 wherein said supply means comprises an electronic weld timing device for each of said transformers and means operatively connecting a source potential respectively through said timing devices to each of said transformers.

3. The device defined in claim 1 including also a work holder on each work station, cam operated means for cyclically and successively opening and closing said work holders at predetermined points in the rotation of said table and for cyclically and successively closing said welding electrodes onto said work immediately after clamping of the work holder and for releasing same from said work immediately before the unclamping of said work holder and cam operated means for initiating operation of said supply means to effect a flow of welding current in each of said pairs of welding electrodes after the closing thereof, said supply means being timed to terminate the flow of welding current through a given pair of electrodes before the opening thereof.

4. The device defined in claim 2 including also cam operated means for cyclically and successively closing said welding electrodes onto said work, cam operated means for initiating operation of said supply means to effect a flow of welding current in each of said pairs of welding electrodes after the closing thereof, said electronic weld timing device being timed to terminate the flow of welding current through a given pair of electrodes before the opening thereof.

5. The device defined in claim 4 wherein each of said weld timing devices includes a phase-shift heat control unit, each of said phase-shift heat control units having a plurality of individually selectable and adjustable means whereby the power applied to each pair of welding electrodes may be individually adjusted and mechanically operated means activating a preselected one of said adjusting means substantially simultaneously with the application of welding current to a given pair of electrodes, each of said pairs of electrodes having one adjustable means operatively associated therewith whereby adjustment of said adjustable means may be utilized to compensate for differences in impedance in the secondary circuits between a transformer and the several pairs of welding electrodes associated therewith in order that the heat actually applied by each pair of welding electrodes to the work may be rendered into a predetermined relationship with respect to each other.

6. The device defined in claim 4 wherein each of said weld timing devices includes a phase-shift heat control unit, each of said phase-shift heat control units having a plurality of individually selectable and adjustable heat-controlling resistances whereby the power applied to each pair of welding electrodes may be individually adjusted and mechanically operated means activating a preselected one of said adjustable, heat-controlling resistances substantially simultaneously with the application of welding current to a given pair of electrodes, each of said pairs of electrodes having one heat controlling adjustable resistance operatively associated therewith for controlling said phase-shift heat control units, whereby adjustment of said heat controlling resistances may be utilized to compensate for differences in impedance in the secondary circuits between a transformer and the several pairs of welding electrodes associated therewith in order that the heat actually applied by each pair of welding electrodes to the work may be rendered into a predetermined relationship with respect to each other.

7. The device defined in claim 1 including pairs of electrically conductive rings fixed to and generally concentric with respect to said table, there being one pair of such rings for each of said transformers and said rings being electrically isolated from each other, means connecting a first end of each of the secondary windings of said transformers respectively to one ring of one of said pairs of rings and means connecting a second end of each of said secondary windings respectively to the other ring of said one of said pairs of rings, and means connecting each pair of electrodes of one of said groups respectively to one of said pairs of said rings and means connecting each pair of electrodes of the other group of electrodes to said other pair of rings.

8. An electric welding machine comprising:
a base;
a table structure mounted on said base and means for effecting rotation of said table structure;
a transformer mounted on said table structure;
a plurality of work stations mounted on said table structure adjacent the periphery thereof in circumferentially spaced relation, each work station including welding electrodes;
means connecting the secondary winding means of said transformer to the welding electrodes at each station;
a source of alternating potential and means including relatively movable parts on said table structure and said base for connecting said source to the primary winding of said transformer in a predetermined pattern;
control means including adjustable phase-shift circuitry connected for controlling the point during each half-cycle of said source at which potential is first supplied to said primary winding;
phase-shift adjusting means associated with each work station and connected to said phase-shift circuitry so that the amount of phase shift can be adjusted to compensate for impedance differences of the work stations; and
switch means connected to the phase-shift adjusting means for the respective work stations and switch operators operable in predetermined relation to rotation of said table structure for actuating said switch means to selectively and alternatively connect said phase-shift adjusting means for the respective work stations to said phase-shift circuitry.

9. An electric welding machine, comprising:
a base;
a table structure rotatably mounted on said base and means for effecting rotation of said table structure;
said table structure including a frame body and a pair of transformers mounted on said frame body;

a plurality of work stations mounted on said table structure adjacent the periphery thereof in circumferentially spaced relation, each of said work stations including a pair of welding electrodes movable toward and away from each other for engaging a workpiece and electrode control means for effecting movement of said electrodes;

each of said work stations also including work gripping means for gripping the workpiece thereat;

two pairs of conductor rings and means connecting the rings of each pair to the opposite ends of the secondary winding of one of said transformers;

conductors connecting the respective rings of each pair to the electrodes of selected ones of the work stations, the electrodes of alternate ones of the work stations being connected to one pair of rings and the electrodes of the other work stations being connected to the other pair of rings;

slip rings mounted on the table structure for rotation therewith and means connecting said slip rings to the primary windings of said transformers;

brushes slidably engaging said slip rings for applying electrical potential thereto;

a source of alternating potential;

a pair of control units connected between said brushes and said source for controlling the electrical potential applied to said brushes, each of said control units including a contactor portion for controlling the application of potential to said brushes, a heat control portion including phase-shift circuitry for controlling the point during the respective half cycles of said source at which potential is first applied to said brushes and a timer portion for controlling the time during which potential is so applied;

a plurality of adjustable resistances connected to said phase-shift circuitry for adjusting the amount of phase shift, each of said resistances being associated with one of said welding electrodes;

first switch means associated with each resistance for connecting it to said phase-shift circuitry so that the amount of phase shift effected during supply of potential to the electrodes of a work station will be adjusted to compensate for impedance differences;

second switch means connected to the contactor portions of the control units for controlling operation thereof;

third switch means connected to said electrode control means for controlling operation thereof; and cam means operable in response to rotation of said table structure for actuating said first, second and third switch means in a predetermined sequence.

10. An electric welding machine, comprising:

a base;

a table structure rotatably mounted on said base and means for effecting rotation of said table structure;

said table structure including a frame body and a plurality of transformers mounted on said frame body;

a plurality of work stations mounted on said table structure adjacent the periphery thereof in circumferentially spaced relation, each of said work stations including a pair of welding electrodes movable toward and away from each other for engaging a workpiece and electrode control means for effecting movement of said electrodes;

means connecting the welding electrodes at each work station to the secondary winding of one of said transformers;

relatively movable means mounted on said table structure and said base for supplying potential to the primary windings of said transformers;

a source of alternating potential;

control units connected between said source and said relatively movable means for controlling the electrical potential applied to said relatively movable means, each of said control units being connected for controlling the supply of potential to one of said transformers and including a contactor portion for controlling the application of potential to said relatively movable means, a control portion including phase-shift circuitry for controlling the point during the respective half cycles of said source at which potential is first applied to said relatively movable means and a timer portion for controlling the time for which potential is so applied;

a plurality of adjustable phase-shift controlling means connected to said phase-shift circuitry of each control unit for adjusting the amount of phase shift, each of said phase-shift controlling means being associated with one of said pairs of welding electrodes which is energized by the transformer controlled by the control unit;

first switch means connected to each of said phase-shift controlling means for connecting it to said phase-shift circuitry so that the amount of phase shift effected during supply of potential to its associated pair pair of electrodes can be adjusted to compensate for impedance differences;

second switch means connected to the contactor portions of the control units for controlling operation thereof, the first and second switch means being arranged so that only one pair of electrodes supplied by a given transformer can be energized at one time;

third switch means connected to said electrode control means for controlling operation thereof; and cam means operable in response to rotation of said table structure for actuating said first, second and third switch means in a predetermined sequence so that after a given pair of electrodes are closed by operation of the third switch means, the first and second switch means for said pair of electrodes are closed so that welding current can flow between said pair of electrodes.

11. An electric welding machine according to claim 8, including:

a second transformer mounted on said table structure;

a plurality of second work stations mounted on said table structure adjacent the periphery thereof in circumferentially spaced relation, each second work station including welding electrodes;

means connecting the secondary winding means of said second transformer to the welding electrodes at said second stations;

the primary winding of said second transformer being connected to said source by relatively movable parts, second control means, second phase-shift circuitry and second phase-shift adjusting means in the same fashion as the first-named transformer;

second switch means connected to second phase-shift adjusting means for the respective second work stations and second switch operators operable in predetermined relation to the rotation of said table structure for actuating said second switch means for selectively and alternatively connecting said second phase-shift adjusting means for the respective second work stations to said second phase-shift circuitry, said first-named switch means and switch operators and said second switch means and switch operators being independent of each other whereby the welding electrodes for the first-named work stations and the second work stations can be energized independently of each other.

References Cited by the Examiner

UNITED STATES PATENTS

| | | | |
|---|---|---|---|
| 2,033,851 | 3/36 | Roth | 219—87 |
| 2,295,925 | 9/42 | Biederman et al. | 219—87 |
| 2,302,748 | 11/42 | Roza et al. | 219—87 |
| 2,325,291 | 7/43 | Weightman | 219—87 |
| 2,425,114 | 8/47 | Mulvany | 219—85 |

RICHARD M. WOOD, *Primary Examiner.*